United States Patent [19] … [11] Patent Number: 5,179,691
O'Brien et al. … [45] Date of Patent: Jan. 12, 1993

[54] N-BYTE STACK-ORIENTED CPU USING A BYTE-SELECTING CONTROL FOR ENHANCING A DUAL-OPERATION WITH AN M-BYTE INSTRUCTION WORD USER PROGRAM WHERE M<N<2M

[75] Inventors: Steven M. O'Brien; Arthur J. Nilson, both of Norristown; Jayant S. Pandya, Center Square; Michael J. Saunders, Norristown, all of Pa.

[73] Assignee: Unisys Corporation, Blue Bell, Pa.

[21] Appl. No.: 336,971

[22] Filed: Apr. 12, 1989

[51] Int. Cl.⁵ .................. G06F 9/455; G06F 9/30; G06F 3/00
[52] U.S. Cl. .................. 395/500; 395/375; 364/DIG. 1; 364/232.3; 364/239.3; 364/244.5; 364/247.5; 364/247.6; 364/247.7; 364/262.81
[58] Field of Search ... 364/200 MS File, 900 MS File; 395/375, 500

[56] References Cited

U.S. PATENT DOCUMENTS

| 3,626,374 | 12/1971 | Chinlund | 395/425 |
|---|---|---|---|
| 4,037,213 | 7/1977 | Alkins et al. | 395/375 |
| 4,079,451 | 3/1978 | Woods et al. | 395/400 |
| 4,099,229 | 7/1978 | Kancler | 364/200 |
| 4,162,519 | 7/1979 | Hanewinkel | 395/400 |
| 4,219,874 | 8/1980 | Gusev et al. | 364/200 |
| 4,236,206 | 11/1980 | Strecker et al. | 364/200 |
| 4,241,397 | 12/1980 | Strecker et al. | 364/200 |
| 4,334,269 | 6/1982 | Shibasaki et al. | 395/775 |
| 4,347,566 | 8/1982 | Koda et al. | 364/200 |
| 4,399,507 | 8/1983 | Gosgrove | 364/200 |
| 4,438,493 | 3/1984 | Cushing et al. | 395/425 |
| 4,447,878 | 5/1984 | Kinnie et al. | 364/200 |
| 4,569,016 | 2/1986 | Hao et al. | 364/200 |
| 4,586,130 | 4/1986 | Butts, Jr. et al. | 364/200 |
| 4,587,632 | 5/1986 | Ditzel | 395/425 |
| 4,590,556 | 5/1986 | Berger et al. | 364/200 |
| 4,602,330 | 7/1986 | Ikeya | 364/200 |
| 4,654,781 | 3/1987 | Schwartz et al. | 395/425 |
| 4,667,308 | 5/1987 | Hayes et al. | 395/425 |
| 4,679,166 | 7/1987 | Berger et al. | 364/900 |
| 4,691,278 | 9/1987 | Iwata | 395/375 |
| 4,736,317 | 5/1988 | Hu et al. | 364/200 |
| 4,747,040 | 5/1988 | Blanset et al. | 364/200 |
| 4,766,566 | 8/1988 | Chuang | 364/900 |
| 4,831,514 | 5/1989 | Turlakov et al. | 364/200 |
| 4,833,657 | 5/1989 | Tanaka | 305/230.04 |
| 4,845,611 | 4/1989 | Turlakov et al. | 364/200 |
| 4,858,105 | 8/1989 | Kuriyama et al. | 364/200 |
| 4,876,639 | 10/1989 | Mensch, Jr. | 364/200 |
| 4,890,218 | 12/1989 | Bram | 395/375 |
| 4,958,275 | 9/1990 | Yokouchi | 395/375 |
| 4,975,835 | 12/1990 | Hidaka et al. | 395/682 |
| 5,083,267 | 1/1992 | Rau et al. | 395/375 |

Primary Examiner—Thomas C. Lee
Assistant Examiner—Krisna Lim
Attorney, Agent, or Firm—John B. Sowell; Mark T. Starr

[57] ABSTRACT

An apparatus for enhancing the operation of a M byte instruction word CPU when operating user programs on an N byte instruction word CPU. The M-Byte instruction word CPU is provided with an N-Byte instruction register and a main memory for supplying N-Byte instruction words or M-Byte instruction words to said N-Byte instruction register. An operational code multiplexer and an parameter code multiplexer are connectable to selective outputs of said instruction register so that any one of the M-Bytes may be selected as an operational code and any one of the remaining M-Bytes may be selected as parameter code bytes, and selection means including sequencer means are provided for operating the operational code multiplexer and the parameter code multiplexer in an M-Byte instruction word CPU mode of operation or as an N-Byte instruction word CPU mode of operation.

14 Claims, 6 Drawing Sheets

N-BYTE STACK-ORIENTED CPU USING A BYTE-SELECTING CONTROL FOR ENHANCING A DUAL-OPERATION WITH AN M-BYTE INSTRUCTION WORD USER PROGRAM WHERE M<N<2M

BACKGROUND OF THE INVENTION

1. Related Applications

This application relates to our copending U.S. application Ser. No. 07/329,136 filed Mar. 27, 1989 entitled "Dual Operating System Computer", now abandoned.

2. Field of the Invention

The present invention relates to a mainframe computer system that is operable on one of two distinctly different operating systems. More particularly, the present invention relates to apparatus for enhancing the operation of the operating system which is different from the preferred operating system for which the dual operating system computer was originally designed.

3. Description of the Prior Art

Compilers and emulators are well known and are generally used as black box systems for converting operating instructions form one format into another format which is usable by different computing systems.

Compilers and emulators have been respectively classified in U.S. Class 395, sub-classes 700 and 500 with dual mode operating system computers and micro programmed computers which have alterable stored micro routines utilized to emulate different computers or computing systems. Such computing systems are discussed in the micro programmable CPU described in U.S. Pat. No. 4,199,811 which has been assigned to the same assignee as the present invention. This prior art reference discusses the reasons that cause micro programmed emulators to be generally slower than an emulated computing system which offers a desirable yet complex solution.

A desirable, and more expensive, approach to emulation is found in the IBM AS400 computing system which operates on two distinctly different operating systems. Such Dual Operating System computers require a new architecture different from either previous architectures or systems being merged together and operate on a single new operating system. A variation of such merged operating systems is described in U.S. Pat. No. 4,747,040 issued to AT&T. This dual mode operating system computer supports UNIX ® and MSDOS ® operating systems in a multi-tasking computer system. The MS-DOS operating systems and its applications are executed in a real or non-protected mode and the UNIX applications are executed by the UNIX operating system in a protected mode to prevent conflicting attempts to access the same peripheral device or to write in the same regions of the main memory. To prevent such conflicts, special merged support hardware needs to be provided.

In our aforementioned application Ser. No. 07/329,136 now abandoned, there is described a dual operating system computer which is conditioned to run user programs on one operating system by loading unique microcode in the instruction processor for its associated operating system and then loading the associated operating system in the main memory. Effectively, this application by use of microcode converts one architecture computing system into a second and different architecture computing system.

It would be desirable to provide an improvement of the aforementioned application Dual Operating System Computer which will more efficiently operate programs designed for operation on the mainframe computing system when loaded with its associated operating system. It would be further desirable to provide the dual operating system computer with apparatus which substantially reduces the amount of microcode required to make the architecture conversion. It would be desirable to improve both the performance and speed of operation of the operating system and its user programs and have the hardware enhancement automatically make the operating system conversion as a result of loading the microcode and operating system without supplemental operations.

SUMMARY OF THE INVENTION

It is a primary object of the present invention to provide a dual operating system computer which efficient runs programs that are designed to be run on a separate and distinct operating systems.

It is another primary object of the present invention to provide an alterable computing system which is operable to perform instructions of different operating systems which are carried out as a plurality of operations defined by machine microcode instructions.

It is another primary object of the present invention to provide a computing system designed to perform instructions according to a predetermined series of microcode instructions that may be programmed with different operating systems.

It is yet another primary object of the present invention to provide critical path hardware for adapting instructions for one architecture and its associated operating system to an architecture for carrying out instructions written in a second and different operating system.

It is a more specific object of the present invention to provide apparatus for changing a six byte 48 bit instruction register into a four byte 32 bit instruction register at the input to an 80 bit control register.

It is another specific object of the present invention to provide a plurality of novel index registers adapted to be loaded with instruction operand information to permit operation of a register oriented computer system instructions on a stack oriented computer system.

It is another object of the present invention to provide novel index register means for converting operand data to addresses for addressing a register file.

It is another general object of the present invention to provide novel index register means for generating addresses of a first operand and a second operand as a substitute for operands that are maintained in stack registers of a register file.

It is yet another object of the present invention to provide novel apparatus for substantially converting a floating point CPU to a fixed point point Central Processing Unit (CPU).

According to these and other objects of the present invention there is provided apparatus for converting a stack oriented mainframe computing system to a register oriented mainframe computing system. Apparatus is provided for converting a six byte instruction buffer to a four byte instruction buffer and index registers are provided for efficiently addressing the register file in a register oriented computing system architecture.

DESCRIPTION OF THE PREFERRED EMBODIMENT

Before describing the figures in detail which show the enhanced apparatus for converting a stack oriented computer system to a register oriented computer system, it should be noted that the exact apparatus and modification described is for converting a Unisys A6 series stack oriented mainframe computer to an architecture which emulates a Unisys System 80 register oriented computer system.

Figure 1:
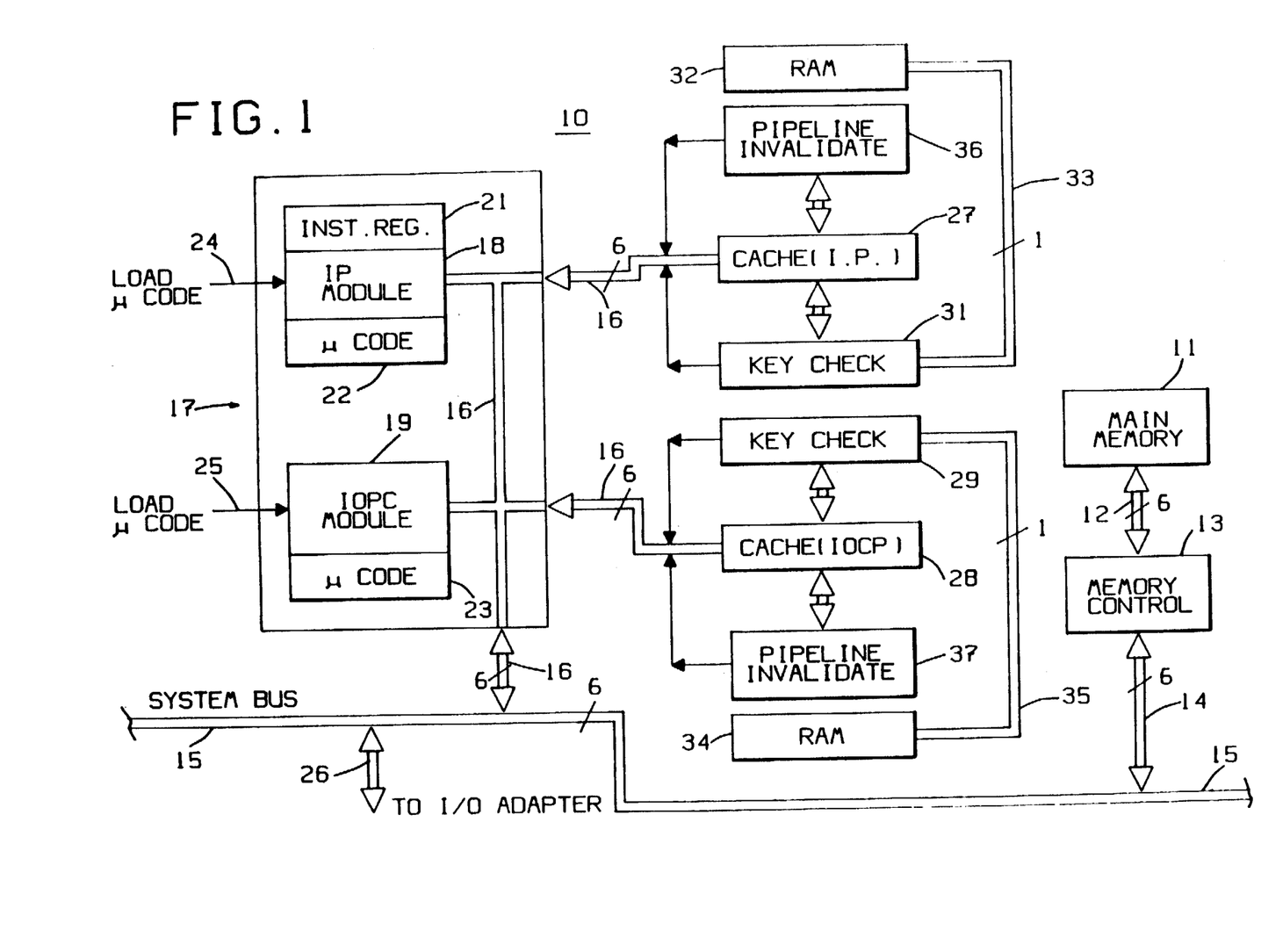
FIG. 1 is a block diagram of a major portion of a first computing system which is designed to be operated on a second and different operating system.

Refer now to FIG. 1 showing a block diagram of a major portion of the Unisys A6 series computing system which is modified and designed to operate as a System 80 computing system. CPU 10 is shown having a main memory 11 coupled by a bus 12 to a memory controller 13. The memory controller 13 is coupled by a bus 14 to the main or system bus 15. A bus 16 which is part of the system bus connects to the processor module 17 which comprises an instruction processor (IP) 18 and an input-/output control processor (IOCP) 19. Instructions and data in the main memory 11 are routed via the system bus 15 to the processor module 17. The instructions are routed to the instruction register 21 and data is routed to buffers associated with the IOCP 19 as well as the IP 18. Instructions or control information are maintained in 48 bit word format in the instruction registers 21 where they are carried out by microcode instruction routines employing the microcode 22 which is stored in a RAM memory in the IP module. Input/output (I/O) operations are performed by the microcode 23 stored in RAM memory associated with the IOCP module 19. The prepare the CPU 10 for operation as a System 80 CPU, unique microcode is loaded via lines 24 and 25 into the microcode registers 22 and 23 respectively and also the operating system associated with the microcode is loaded into the main memory 11 which completes the preparation of the CPU 10 for operation as a System 80 CPU. All of the present invention enhancements to be described hereinafter are automatically enabled through the process of loading the unique microcode in RAM memory and the unique operating system in the main memory. The width of the buses is designed in bytes comprising eight bits of data and one parity bit.

A bus 26 is shown connected to the system bus 15 and to an I/O adapter (not shown) which serves as a interface controller between peripheral devices and the CPU 10. Such peripheral devices are commonly employed to store programs and data which are used by the computer system 10. The IOCP 19 loads programs and data from the peripherals via bus 16 to main memory 11 via system bus 15. The instruction processor (IP) 18 performs the instructions stored in main memory 11 on the data stored in main memory 11 and maintains the overriding control of the IOCP via bus 16.

Bus 16 connects to a first cache memory 27 associated with the IP 18 and a second cache memory 28 associated with the IOCP 19. The cache memories are dedicated to their associated IP and IOCP modules.

The key check logic 29 and 31 is employed to protect areas of memory 11 from being accessed by nonauthorized programs and is described in detail in our aforementioned copending application Ser. No. 07/329,136 now abandoned. RAM 32 and bus 33 are an integral part of the key check logic 31. Similarly, RAM 34 and bus 35 are an integral part of key check logic 29.

Pipeline invalidate logic 36 and 37 is employed to maintain the integrity of the instruction register 21 by detecting when a write operation is being performed to a proper location in main memory 11 that is in the instruction register 21.

The pipeline invalidate logic and key check logic do not constitute a part of the present invention and do not require detailed explanation herein.

Figure 2:
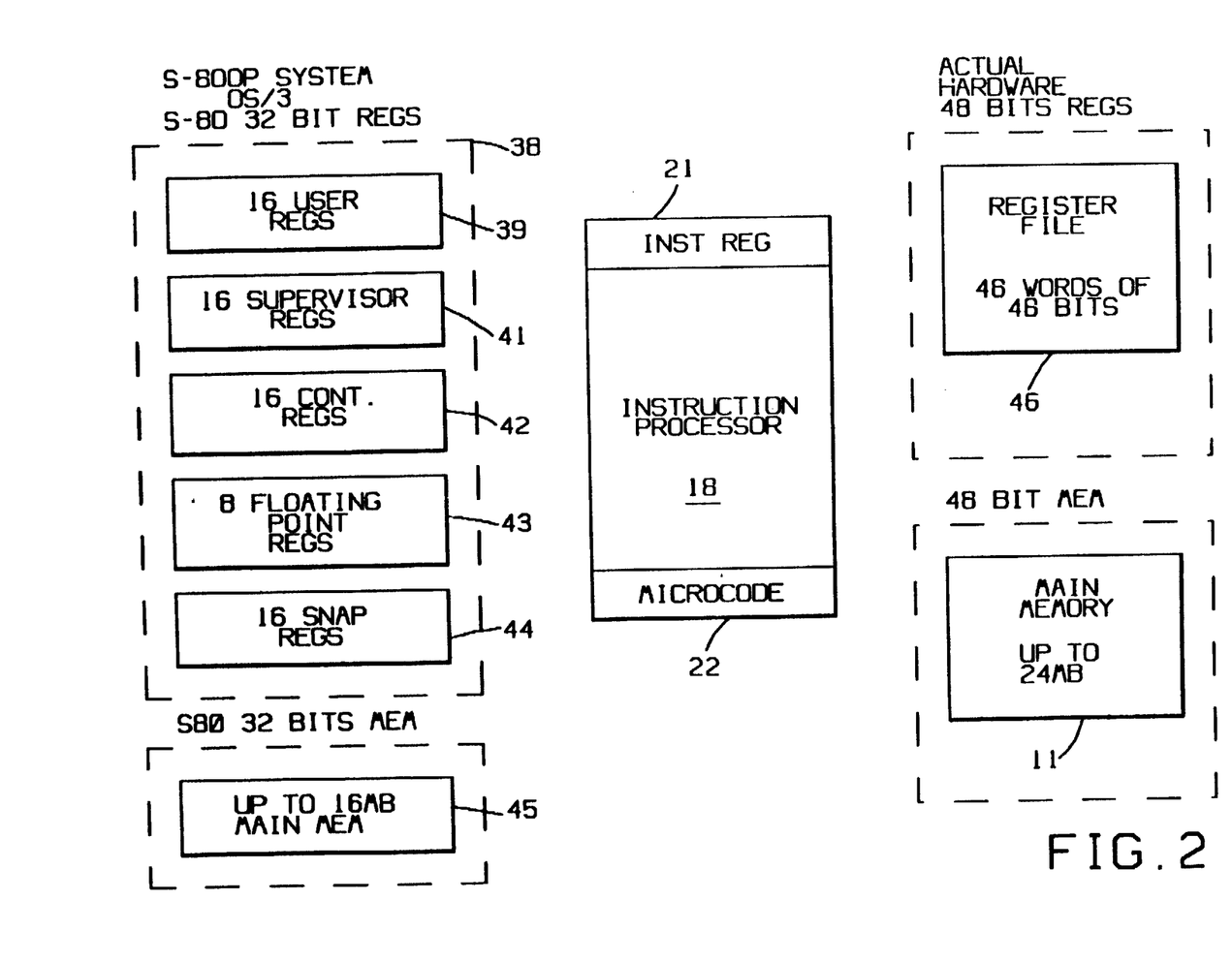
FIG. 2 is a block diagram of the hardware which is functionally seen by the different operating system showing the actual main memory and register file of the first computing system having a modified instruction processor therebetween.

Refer now to FIG. 2 showing a block diagram of the hardware functionally seen by the System 80 operating system and showing the actual hardware which is employed in the A6 series CPU. In a prior art System 80 CPU, the register file 38 comprises 16 user registers 39, 16 supervisor registers 41, 16 control registers 42, 8 floating point registers 43 and 16 snap registers 44 for a total of 72 registers having 32 bit word lengths. Further, the prior art System 80 main memory 45 comprises up to 16 megabytes of 32 bit words. The main memory of the Unisys A6 series CPU is provided with 24 megabytes of 48 bit words and is employed to store the System 80 Operating System designed OS/3 and data.

The problem arises in that the file register provided in the Unisys A6 series CPU is only provided with 48 registers, each of which comprises a 48 bit word. Whereas the prior art System 80 CPU requires 72 registers or capacity for 72 words having 32 bit word lengths. In order to overcome this conflict, registers 42 to 44 are permanently stored in a fixed location in main memory 11. These registers and their contents need not be stored or filed in register file 46. Occasionally the contents of one of the registers 42 to 44 is temporarily stored in the register file for purposes of examination by the instruction processor 18 and then returned back to main memory 11. If a user program is running, a supervisor program is not running, thus, all 16 of the user registers in memory 11 or supervisor registers in memory 11 are loaded into 16 registers of the register file 46 for use by the program, thus, leaving the other 32 registers for use as scratch register, status register and control information necessary for proper and efficient operation of the System 80 CPU.

Instructions loaded in the instruction register 21 are supplied by main memory 11 via system bus 15 as described hereinbefore. The previously loaded microcode 22 in instruction processor 18 carries out the routines specified by the instruction in instruction register 21 so as to cause the 32 bit user program instruction in register 21 to operate in the identical manner as if it was using the register file 38 when in fact it is employing the register file 46 as will be explained in greater detail hereinafter.

Figure 3:
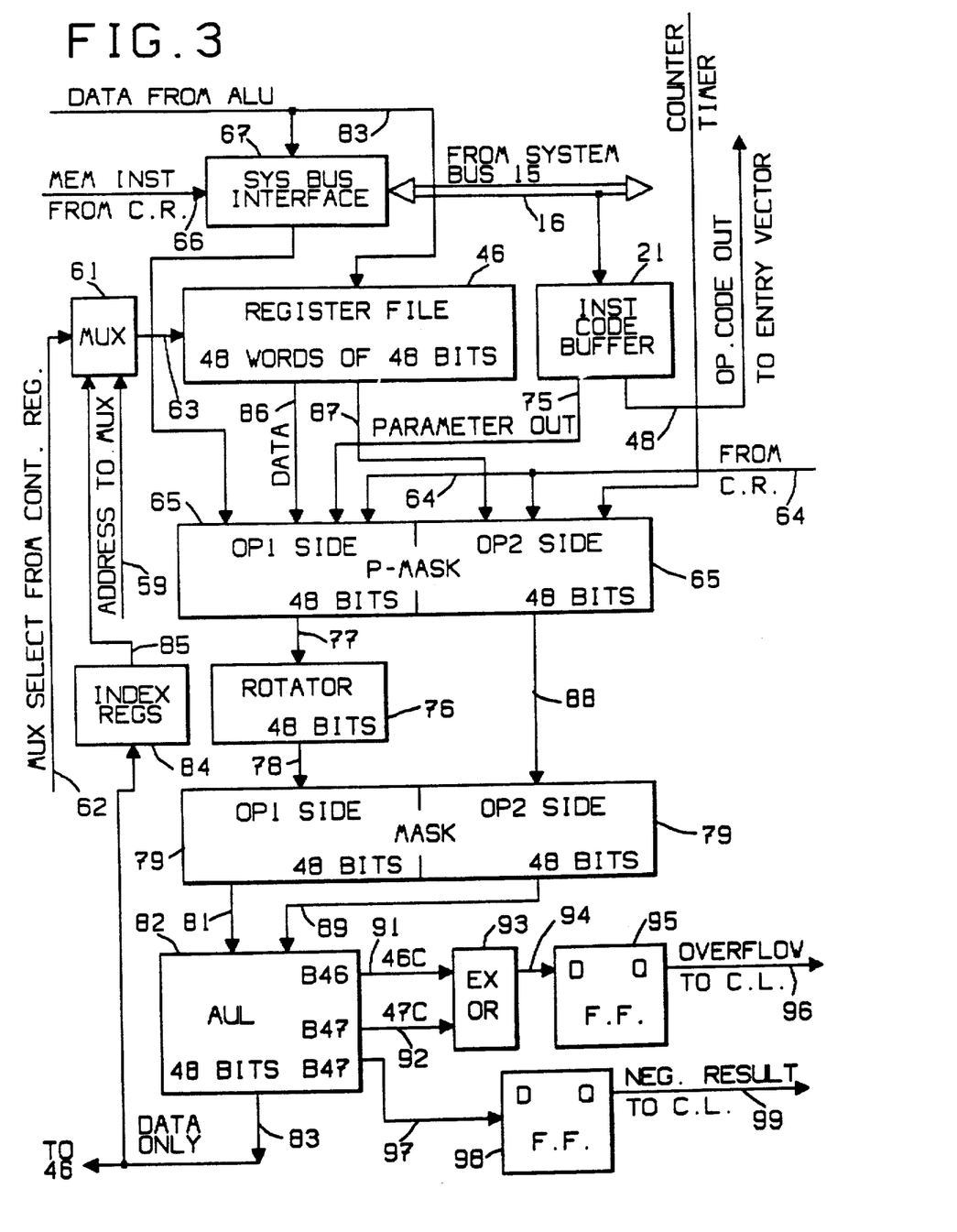
FIG. 3 is a more detailed block diagram of a part of the hardware modification to the instruction processor (IP) showing the present invention instruction code buffer, register file and check circuits for overflow detection and negative result detection.
Figure 4:
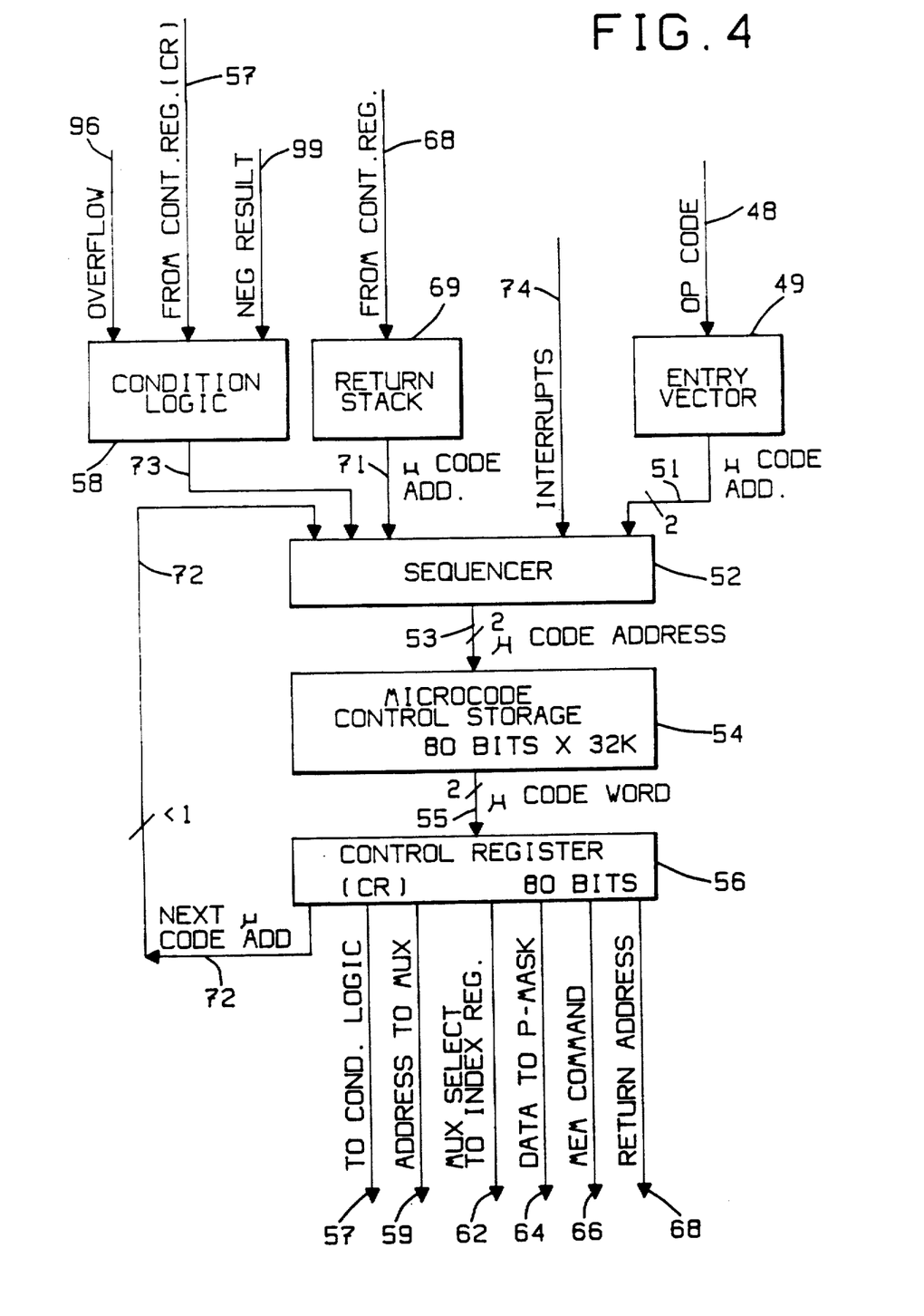
FIG. 4 is a more detailed block diagram of another part of the instruction processor showing the enhanced control signals employed in FIG. 3.

Refer now to FIGS. 3 and 4 showing more detailed block diagrams of the hardware modification of the instruction processor 18. For purposes of explanation, assume that a System 80 user program has been loaded into the main memory 11 together with the prior art OS/3 Operating System. Unique microcode is also loaded in module 17 to provide a System 80 version of the Unisys A6 CPU. If a new user program is just starting up, the operating system executes an instruction to begin processing a user program. This instruction causes the 16 supervisor registers 41 to be transferred to main memory 11 and the 16 user registers 39 in main memory to be transferred to the register file 46. The instruction being executed also loads the first instruction of the user program into the instruction code buffer or instruction register 21 via the system bus 15 and bus 16. The instruction stored in buffer 21 comprises a one byte op code and up to six bytes of parameter information as will be explained hereinafter. The op code is transferred via line 48 to the entry vector 49 shown in FIG. 4. The op code stored in entry vector 49 is employed to generate a microcode address on line 51 which is applied to the sequence 52 to produce the actual microcode address which accesses control storage register 54 to produce a microcode word on line 55 which is stored in control register 56. The microcode word stored in control register 56 (CR) is the first instruction of a microcode routine comprising a plurality of microcode words which will be executed by the instruction processor 18. The 80 bit control word in CR 56 produces a control select signal on line 57 to condition logic 58 having an output line 73 coupled to sequencer 52. Register file 46 addresses are produced on line 59 which are applied to the multiplexer 61. A MUX select signal on line 62 is applied to the multiplexer of the index register means 84 to select the address online 63 to be applied to the register file 46. A data signal on line 64 to the P mask 65 provides data constants to be used in operation of the instruction processor. A control signal on line 66 to the memory controller 13 is applied as data via line 66 to the system bus interface 67 that generates a signal on bus 16 which instructs the memory controller 13 whether a read or write operation is to be performed. A 15 bit microcode return address is generated on line 68 which is applied to the return stack 69 which comprises a stack of 64 registers. When the return address on line 68 is associated with a call instruction, the address gets put on the top of the return stack 64. When a return instruction is executed the next micro instruction to be executed is taken from the top of the stack 69 and applied via line 71 to the sequencer 52. When the microcode word instruction in register 56 is completed, the address of the next microcode instruction is supplied via line 72 to the sequencer 52 to produce the next microcode address on line 53 which accesses control storage 54 and produces the next microcode word on line 55.

Signal line 73 coupled to sequencer 52 permits a branch operation. The interrupt signals on lines 74 to sequencer 52 calls an interruption of the microcode routine and can only occur under special circumstances which are not related to the present invention.

The just described microcode routine which was initiated by the instructions stored in instruction code buffer 21 which produced the op code on line 48 (shown in FIG. 3) also reads the parameter data from the instruction code buffer on line 75 which is applied to the operand 1 side of the P mask 65. The data from P mask 65 is applied to the rotator 76 via line 77 and is passed through or rotated depending on the instruction in the control register 56, to produce a data signal on line 78 which is applied to the operand 1 side of mask 79 to produce a data signal on line 81 that is applied to one of the two inputs to the Arithmetic Logic Unit (ALU) 82. The data on line 81 is part of the parameter of the op code and appears on data output line 83 from ALU 82. The parameter signal is applied to the index register 84 and to the input of the register file 46 via line 83. The output on line 85 from the index register 84 is applied to the Multiplexer (MUX) 61. When the next microcode routine instruction occurs, the select signal on line 62 selects the parameter data signal loaded in index register 84 as an output on line 85 which is presented on line 63 to the register file 46. The data stored in register file 46 represents the user registers and are read out on data line 86 and data line 87 to the operand 1 and operand 2 sides of P mask 65 respectively. The data on operand 1 side is passed to the ALU via lines 77, 78 and 81. At the same time, the data on operand 2 side of mask 79 to produce modified data on line 89 which comprises the second input to ALU 82. The mask information applied to ALU 82 is processed and the resulting data signal on line 83 are passed through the loop and register file 46 where it is now stored in the register file word pointed to be the index registers 84 as will be explained in greater detail hereinafter.

It will be understood that there is flexibility in the use of the index registers 84 and the register file 46. For example, operand 1 can be selected using the index registers and operand 2 can be selected using the data from the control register 56. The reverse is true in that the register file word can be pointed to by the address in the index register 84 while operand 1 is pointed to by the address from the control register 56. Before explaining in detail how this occurs, it will be noted that the ALU 82 produces a carry bit signal on line 91 from the bit 46 position and that a second carry is produced at the bit 47 position on line 92 both of which are applied top the exclusive OR gate 93 to produce an output signal on line 94 indicative of an overflow condition in the arithmetic logic unit 82. The overflow signal on line 94 is applied to the data side of flipflop 95 to produce an overflow output signal to the condition logic 58 via line 96 which is shown as an input 96 to condition logic 58 in FIG. 4. Signal line 97 is connected to bit position 47 and is applied as a data input to flipflop 98 to produce a negative result signal on line 99 when the arithmetic logic unit 82 generates a negative result. The negative result signal on line 99 is applied to condition logic 58 as shown in FIG. 4. As mentioned hereinbefore, the condition logic 58 output signal on line 73 is employed to perform a branching operation in the microcode routine.

Figure 5:
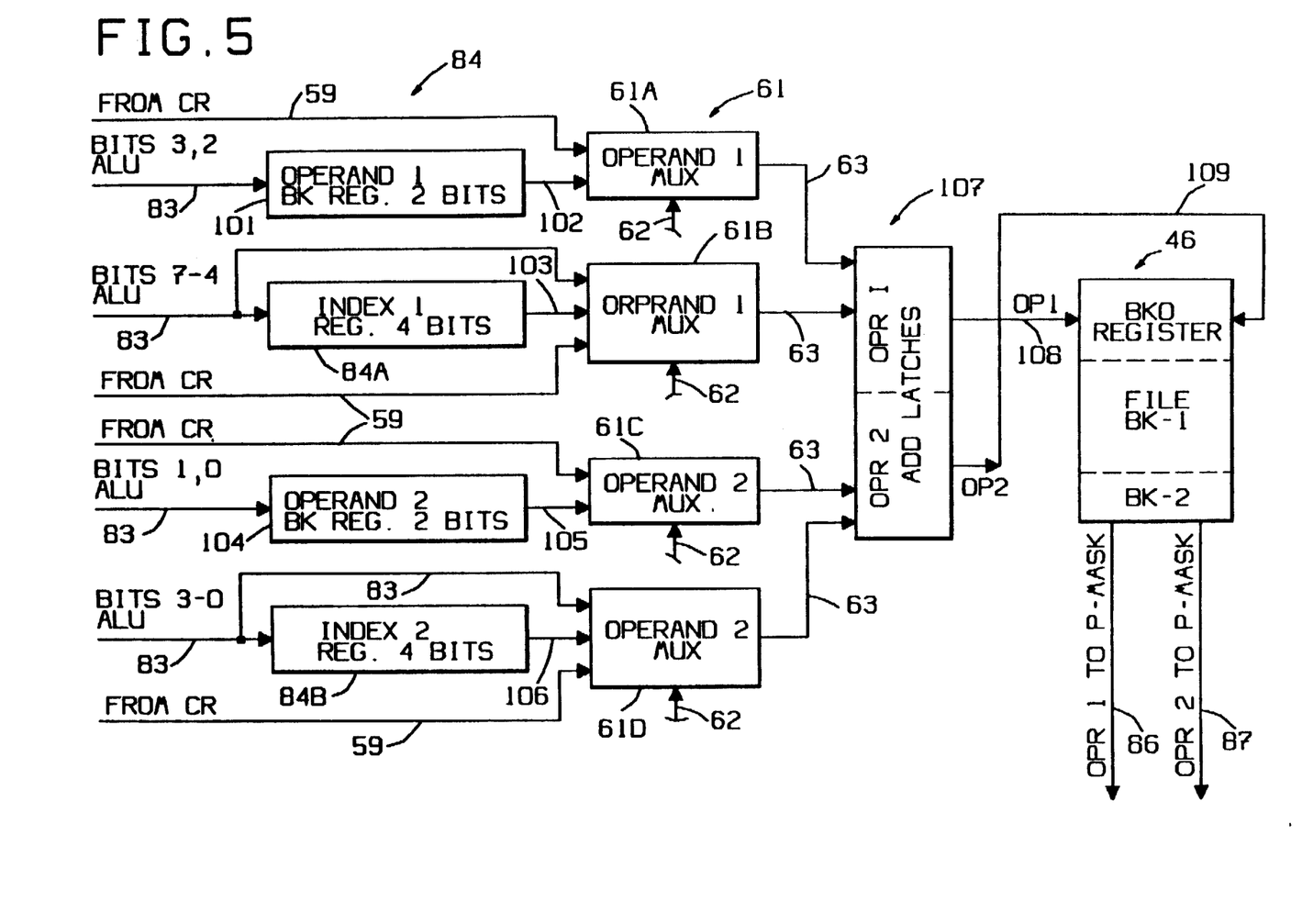
FIG. 5 is a detailed block diagram showing the orientation of the instruction code buffer and apparatus for converting a six byte instruction buffer to a four byte instruction buffer.

Refer now to FIG. 5 showing a more detailed block diagram of the novel index register 84 apparatus for addressing the three banks of 16 registers in the register file 46. The index registers 84 are shown comprising an operand 1 bank register 101 which holds the number 3 and number 2 bits from the ALU supplied via line 83. The output of the bank register 101 on line 102 form s a supplemental address to the address being presented on line 59 to the operand 1 MUX 61A. The index register 84A receives four address bit positions 7 to 4 which form a supplemental address on output line 103 to the address being supplied on line 59 to the operand 1 MUX 61B. The MUX select signal to the index registers on line 62 is capable of selecting the outputs of the two operand 1 MUXes 61A and 61B, or all four MUXes 61A to 61D or as a third alternative, the outputs from the MUXes 61C and 61D as will be explained. In similar manner, the address bits 1,0 from the ALU 82 are applied to the operand 2 bank register 104 as two auxiliary bits on output line 105 to operand 2 MUX 61C. Further, four auxiliary address bits on line 83 from ALU 82 are applied to index register 84B to provide an auxiliary address on output line 106 as an input to the operand 2 MUX 61D. The reason for presenting the operand and index registers shown in FIG. 5 is to provide a critical path modification of the Unisys A Series CPU which does not employ index registers. When the dual operating system computer 10 is operating as an A Series CPU, fixed signals on control line 59 are applied directly through the MUX 61 to the operand 1 and operand 2 address latches 107 or may be varied by information on line 83. The System 80 CPU also operates in the same mode of operation using the signals on control line 59 to access the register file 46. However, System 80 CPU may also employ the index registers 84A and 84B to access the 16 user registers or the 16 supervisor registers when they are located in the register file 46 and for the purposes of indirectly addressing other registers reassigned in the register file 46. This enhancement to the A Series CPU enables addressing with variable address and permits accessing the register file much faster for a register oriented architecture CPU. Latch 107 is loaded with the output of all four MUXes 61A to 61D whose inputs are varied to determine the outputs on line 63. The operand 1 six bit address is presented on line 108 to the register file 46 and the operand 2 six bit address is presented on line 109 to the register file 46 shown having three banks, bank 0, bank 1 and bank 2, each comprising 16 registers. Selection of operand 1 and operand 2 addresses in register file 46 produce operand 1 and operand 2 data on lines 86 and 87 which is applied to P mask 65 as explained hereinbefore which reference to FIG. 3.

Figure 6:
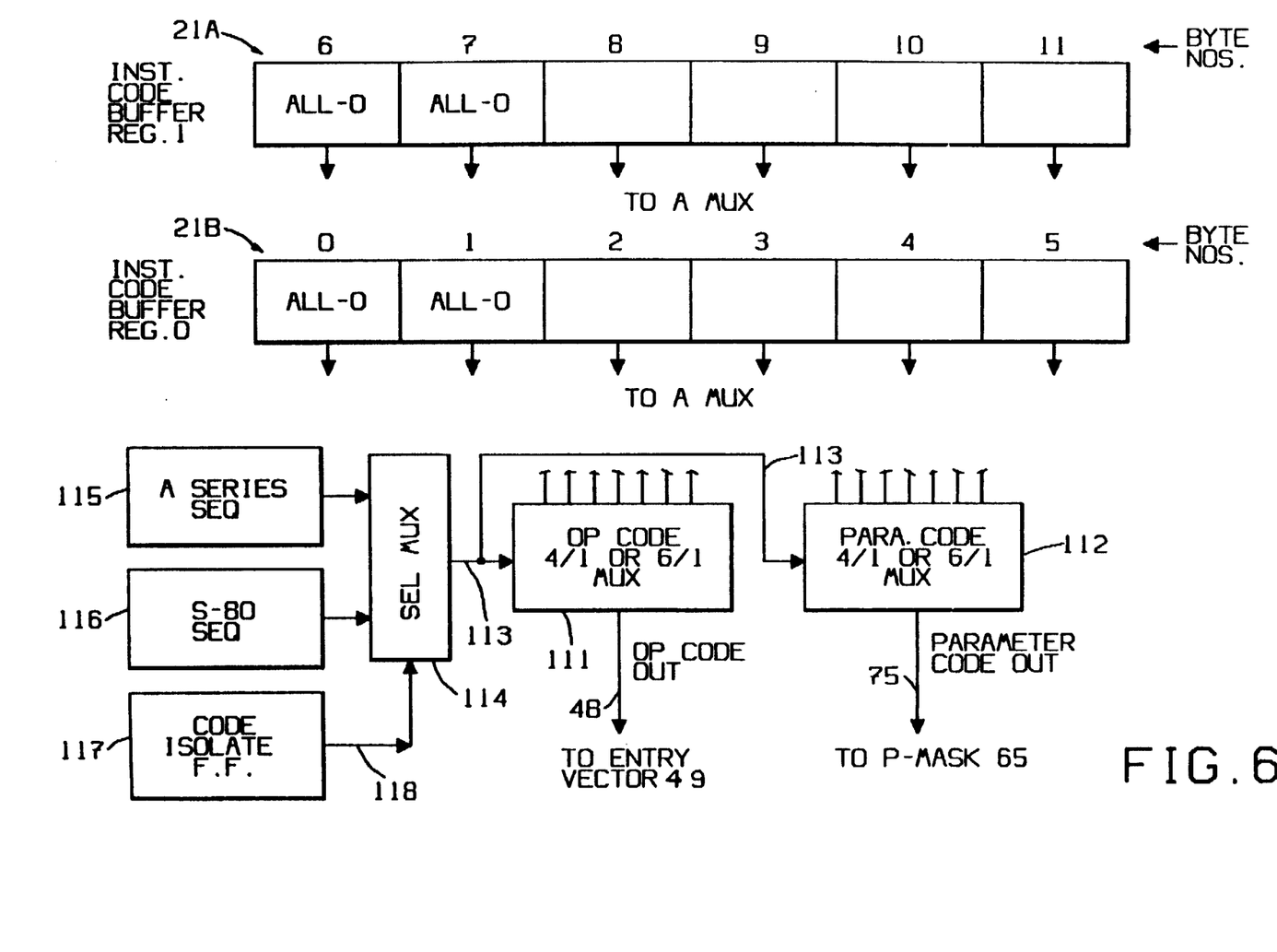
FIG. 6 is more detailed block diagram of the noel index register apparatus for addressing three banks of sixteen registers in the register file.

Refer now to FIG. 6 showing a detailed block diagram of the orientation of the instruction code buffer and apparatus for converting a six byte instruction buffer to a 4 byte instruction buffer. The instruction which is loaded into instruction register 21 comprises two words of 6 bytes each which comprises 48 bits each. The System 80 CPU employs 32 bit instruction words, thus, only requires 4 of the 6 bytes shown in registers 21A and 21B. Register 21A stores bytes 6 through 11 and the two most significant bytes 6 and 7 may be loaded with all zeros for System 80 CPU operation. Similarly, instruction buffer register 21B stores bytes zero through five and the two most significant bytes 0 and 1 may be loaded with all zeros for System 8 operation. The output of all 12 bytes of the registers 21A and 21B are shown diagrammatically as being applied to a MUX which will be defied hereinafter. Since the instruction for System 80 Operation always comprises one byte which is designed as operation code accompanied by 1, 3 or 5 bytes, designated for parameter data, the connection to the MUXes 111 and 112 are not fixed. For example, any one of the bytes 2 to 5 and 8 to 11 may be selected by MUX 111 as the op code output for line 48 that is applied to the entry vector 49. Similarly, any of the 8 byte positions 2 to 5 and 8 to 11 may be selected by mUX 112 as a parameter code output on line 75 to P mask 65. It will be understood that MUXes 111 and 112 when operating as a System 80 CPU operate as a 4 to 1 MUX and when operating as a Unisys A series CPU operate as a 6 to 1 MUX. For purposes of making this MUX selection on line 113 a selection MUX 114 is provided which has an A Series CPU sequence selection block 115 and a System 80 sequence selection block 116, one of which is selected by the code isolate flipflop 117 via line 118.

Having explained a preferred embodiment of a dual operating system CPU with reference to two specific computers, one being a stack oriented architecture A Series CPU and the other being a register oriented architecture machine designated a System 80 CPU, it will be understood that the architectures of two diverse operating systems may be combined in a single hardware architecture by employing microcode routines in the instruction processor and making minor apparatus or hardware modification for the critical paths to enhance the performance of the secondary operating system processor. The critical path apparatus modification mode of operation does not require redesign of the architecture and operating system of either computer of a dual operating system as was required for the IBM AS400 which combined a system 36 and system 38 operating system into one merged computer employing a single operating system. Thus, it will be understood that the present invention offers substantial savings by minor modification rather than major redesign while achieving or maintaining the desired performance of both systems used in the dual operation system CPU. Further, it will be appreciated that conversion of a 6 byte instruction buffer to a 4 byte instruction buffer as explained hereinbefore is further enhanced when the System 80 sequencer completely omits a sequence which would require the reading out of the two most significant bytes of the instruction code buffer 21A and 21B. State differently, a System 80 sequence would start with byte 2 through byte 5 and again at byte 8 through byte 11 without sequencing bytes 0, 1, 6 or 7.

What is claimed is:

1. An apparatus for enhancing the operation of an M-Byte instruction word CPU operating user programs on an N-Byte instruction word CPU where N is greater than M and less than 2M, comprising:
   an N-Byte instruction word CPU having an N-Byte instruction register;
   a main memory for supply either N-Byte or M-Byte instruction words to said N-Byte instruction register;
   a selection means for selecting an M-Byte instruction word mode of operation;
   an operation code MUX connected to all bytes of said N-Byte instruction register for loading only M-Byte instruction words selected by said selection means and for providing one byte operational code output to an operational code register;
   a parameter code MUX connected to all bytes of said N-Byte instruction register for loading only remaining bytes of said M-Byte instruction words selected by said selection means and for providing a parameter code output to a register file; and, wherein said selection means coupled to said operational code MUX and parameter code MUX for controlling bytes selection of said operational code MUX and parameter MUX in order to converting said N-Byte instruction word CPU to an M-Byte instruction word CPU.

2. Apparatus as set forth in claim 1 where M defines four bytes and N defines six bytes.

3. Apparatus as set forth in claim 2 wherein said MUXes are operable as four to one MUXes, and said MUXes scan two of the six bytes at a time form said N-Byte instruction word.

4. Apparatus as set forth in claim 1 wherein said selection means comprises a selection MUX having a code isolation input signal for selecting an M-Byte instruction mode of operation or an N-Byte instruction mode of operation.

5. Apparatus as set forth in claim 4 which further includes an M-Byte sequencer and an N-Byte sequencer coupled to the input of said selection MUX for selecting the sequence of byte inputs to said operational code MUX.

6. Apparatus as set forth in claim 5 wherein said byte sequencer selected by said selection MUX is coupled to said parameter code MUX for simultaneously selecting the sequence of byte inputs to said parameter code MUX.

7. Apparatus as set forth in claim 1 wherein said M-Byte instruction word comprises one operational code byte and a plurality of parameter code instruction bytes.

8. Apparatus as set forth in claim 1 wherein said M-Byte instruction word CPU further includes an instruction sequencer,
control register means coupled to said instruction sequencer for controlling a sequence of code routines,
an ALU coupled to the output of said register file and the output of said operation code MUX, and
index register means coupled between said ALU and said register file of said CPU for generating supplemental addresses designating registers in said register file in response to signals form said control register means and said ALU.

9. Apparatus as set forth in claim 8 wherein said index register means comprises a plurality of index registers coupled to said register file.

10. Apparatus as set forth in claim 9 wherein said index register means further includes a plurality of operand bank registers.

11. Apparatus as set forth in claim 10 wherein said index register means further includes a plurality of multiplexers, coupled to the output of said operand bank registers and said index registers.

12. Apparatus as set forth in claim 11 wherein said index register means further includes an address latch coupled to the output of said operand multiplexers for storing a plurality of operand addresses which point to registers in said register file.

13. Apparatus as set forth in claim 8 wherein said index register means includes a plurality of operand bank registers and a plurality of index registers having an input coupled to said ALU for supplying output supplemental bits to said register file which are employed to generate supplemental addresses in said register file.

14. Apparatus in an instruction processor having a stack oriented architecture CPU, for enhancing the operation of user programs written for a register oriented architecture CPU, comprising:
a register file having a plurality of registers;
instruction register means;
control register means, coupled to receive output from said instruction register means, having a plurality of outputs for generating signals required for performing a code routine in response to system information and said output received from said instruction register means;
an ALU having inputs coupled to receive outputs of said register file and said instruction register means for generating output data indicative of supplemental addresses in said register file in response to said inputs received; and
index register means coupled between said ALU and said register file for generating said supplemental addresses which designate supplemental registers in said register file when actuated in response to at least one of said output signals from said control register and said output data from said ALU.

* * * * *